Aug. 5, 1952   J. H. COUNTRYMAN   2,605,649
BICYCLE PEDAL

Filed June 6, 1950   3 Sheets-Sheet 1

INVENTOR.
JAMES H. COUNTRYMAN
BY Clifford C. Bradbury
ATTORNEY

Aug. 5, 1952 J. H. COUNTRYMAN 2,605,649
BICYCLE PEDAL
Filed June 6, 1950 3 Sheets-Sheet 2
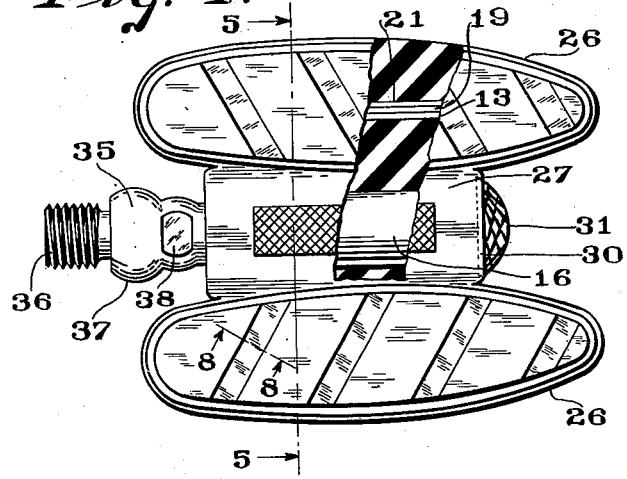
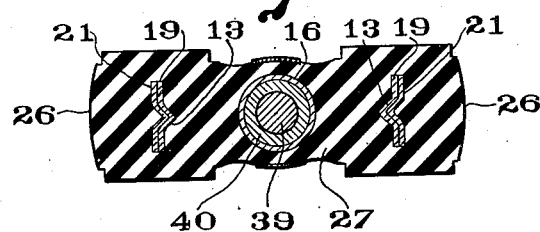
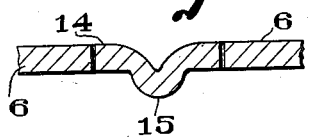 
 
INVENTOR.
JAMES H. COUNTRYMAN.
BY Clifford C. Bradbury
ATTORNEY Aug. 5, 1952  J. H. COUNTRYMAN  2,605,649
BICYCLE PEDAL
Filed June 6, 1950  3 Sheets-Sheet 3
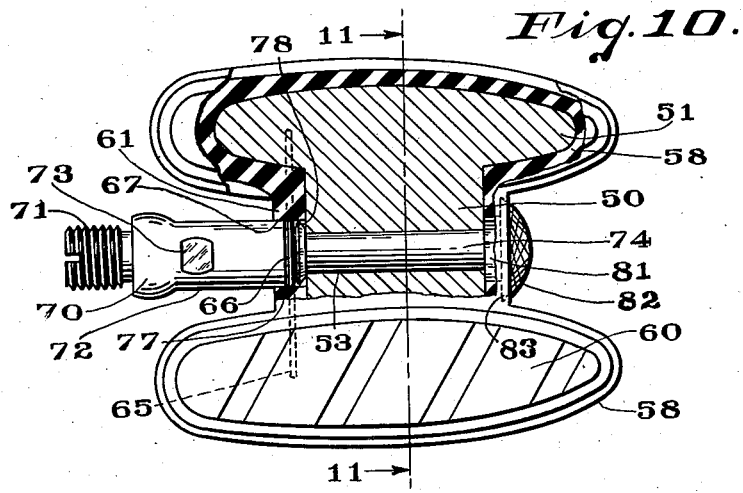
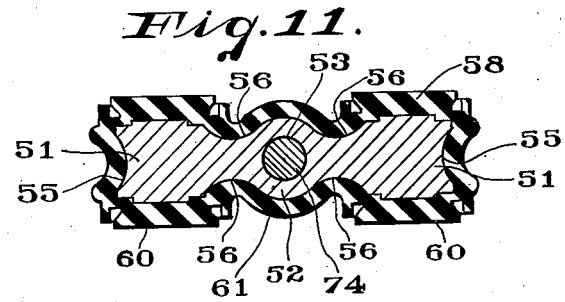
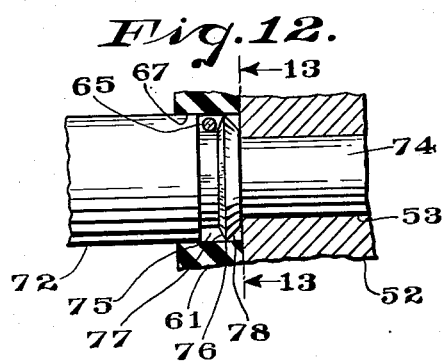 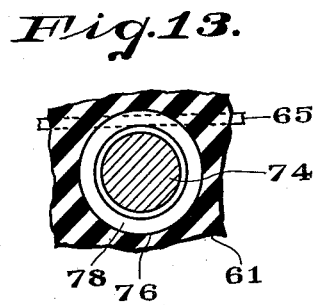
INVENTOR.
JAMES H. COUNTRYMAN
BY Clifford C. Bradbury
ATTORNEY Patented Aug. 5, 1952

2,605,649

UNITED STATES PATENT OFFICE 2,605,649

BICYCLE PEDAL

James H. Countryman, West Middletown, Ohio

Application June 6, 1950, Serial No. 166,431

1 Claim. (Cl. 74—594.4)

This invention relates to a bicycle pedal.

One object of the invention is to provide a bicycle pedal of sturdy construction, of few and simple parts, which may be easily and economically produced and assembled.

Another object of the invention is to provide a unitary tread structure which may be easily attached to and detached from the pedal crank without the use of tools.

Another object of the invention is to provide a pedal tread structure in which there are no exposed metal parts.

Another object of the invention is to provide a unitary pedal tread support of metal construction.

Features of the invention have to do with the details of construction and assembly of parts which result in the elimination of screws, bolts, nuts and ball races.

My invention is illustrated in the accompanying drawings, in which

Fig. 4 is an assembled view of the finished pedal structure with a part of the tread broken away.

Fig. 5 is a cross-sectional view of the assembled pedal taken upon line 5—5 of Fig. 4, displaced ninety degrees from Fig. 4.

Fig. 6 is an enlarged sectional view taken upon line 6—6 of Fig. 1.

Fig. 7 is an enlarged cross-sectional view taken upon line 7—7 of Fig. 2.

Fig. 8 is an enlarged sectional view of the tread surface taken upon the diagonal line 8—8 of Fig. 4.

Fig. 9 is an enlarged view of the cylindrical portion of the frame illustrating its assembly.

Fig. 10 is a top plan view with parts in section of a modified form of the structure.

Fig. 11 is a transverse sectional view taken upon line 11—11 of Fig. 10, displaced ninety degrees from Fig. 10.

Fig. 12 is a fragmentary detail view of the inner end of the modified structure, and Fig. 13 is a transverse sectional view taken upon line 13—13 of Fig. 12.

Figure 1:
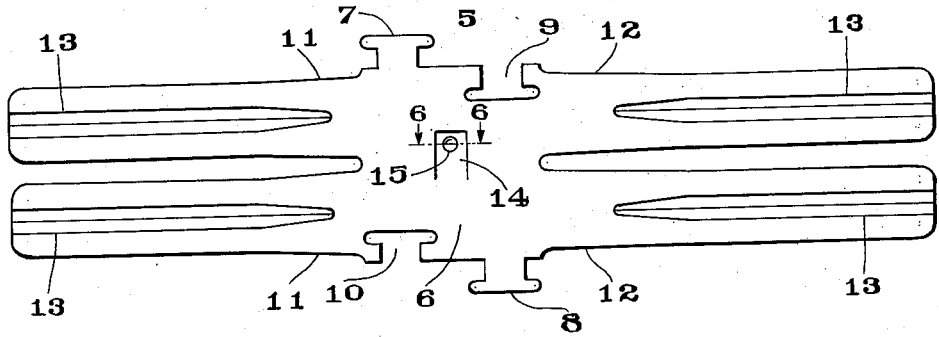
Fig. 1 is a plan view of a metal stamping from which the frame of the pedal is formed.
Figure 2:
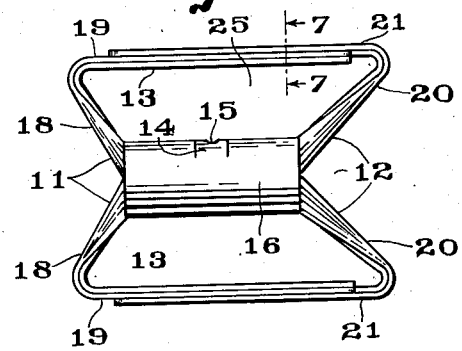
Fig. 2 is a view of the stamping after a forming operation.
Figure 3:
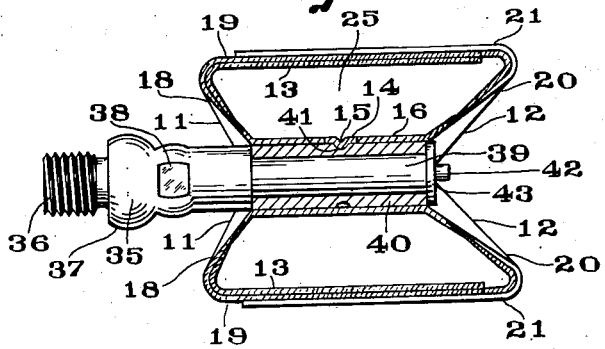
Fig. 3 is a longitudinal sectional view of the pedal frame and bearing bushing mounted upon a spindle.

With reference to the drawings, a metal stamping 5 (Fig. 1) comprises the body portion 6, provided on each edge with key portions 7 and 8 and notches 9 and 10 adapted to receive the key portions 7 and 8 for interlocking engagement when the body portion 6 is rolled into cylindrical form as shown at 16, Fig. 9. Strap members 11 and 12, formed integrally with the plate 6, extend in parallelism in opposite directions therefrom, the straps 11 being shorter than the straps 12.

The blank 6, after being stamped, is hit with a forming tool to produce a reinforcing rib 13 in each of the straps 11 and 12. This operation also produces a fracture portion 14 in the body of the plate 6, and a boss 15 in the face of the fracture portion 14. The boss 15 will be on the inside of the cylinder 16 formed by rolling the plate 6.

After the plate 6 is rolled into cylindrical form, each of the shorter straps 11 will be bent into the form of an angle comprising an angularly extending leg 18 and a leg 19 extending horizontally to the cylindrical portion 16. Similarly, each of the longer straps 12 will be bent to form an angular leg 20 and a horizontal leg 21 which overlies each of the legs 19 of the straps 11 to form a substantially rectangular frame 25.

This rectangular frame is completely encased in a body of plastic composition to form oval shaped flat faced tread surfaces 26, joined by a web 27, which houses the cylindrical portion 16 of the frame. The plastic body may be applied by inserting the rectangular frame 25 into a properly formed mold filled with the required compound and subjecting the mold to the proper heat and pressure treatment.

During the molding process, a cavity 30 may be formed in one end of the web portion 27 to receive a light reflector 31.

A spindle 35 for supporting the pedal tread comprises a threaded shank 36, an enlarged shoulder portion 37, a socket portion 38 to receive a wrench, and a bearing support 39. A bronze oil bearing bushing 40, mounted upon the support 39, is provided with a peripheral groove 41 which is adapted to receive the projection 15 in the cylindrical portion 16 of the frame 25. A reduced end portion 42 on the bearing support 39 receives a thrust disc 43 which may be secured in place by upsetting the end of the portion 42.

The pedal tread may be attached to the spindle 35 by sliding the cylindrical portion 16 of the frame 25 over the bearing 40 until the projection 15 of the fracture portion 14 is sprung into the peripheral groove 41, in which relation the parts will be secured firmly together. By exerting sufficient pull upon the tread portion, it may be withdrawn from the spindle 35. This makes it easy to replace a tread.

As shown in Figs. 10 and 11, a supporting frame 50 is provided, comprising wing portions 51, connected to a cylindrical shaped web portion 52, provided with a cylindrical bore 53. The wing portions 51, as viewed from the top, are generally oval in contour, and the outer edges are each provided with a concave portion 55. Depressions 56 are provided between the inner edges of the wing portions 51 and the web portion 52.

The supporting frame 50 above described may be an iron casting, and it is encased in a body 58 of plastic composition to form oval shaped flat faced tread portions 60 covering the wing portions 51, joined by a web portion 61, enclosing the web portion 52 of the frame 50. The tread surface 58 may be applied by molding it directly onto the supporting frame 50.

During the molding process, a steel wire 65 extending transversely between the tread surfaces and adjacent to the inner end of the web portion 52 is secured at its opposite ends in the molding material with an exposed central portion 66 between opposite sides of a centrally located cylindrical opening 67 in the inner end of the molded web portion 61.

A spindle 70 for supporting the pedal tread comprises a threaded shank 71, an enlarged shoulder portion 72, a socket portion 73 to receive a wrench, and a bearing support 74 for engagement with the bore 53 of the supporting frame 50. A circumferential groove 75 is provided in the inner end of the enlarged shoulder portion 72. This groove 75 is separated from the bearing support 74 by a collar 76 having an abruptly sloping face 77 adjacent the groove 75, and a more gradually sloping face 78 adjacent the bearing support 74.

The pedal is assembled by slipping the frame 50 of the pedal over the bearing support 74 of the spindle 70 and applying sufficient pressure to spring the steel wire 65 over the collar 76 by pressing it outwardly against the resiliency of the molded material in which its ends are embedded. After passing the crown of the collar 76, the wire 65 will be forced to the bottom of the groove 75 where it will be free to rotate around the spindle 70 and retain the pedal tread against removal except by a longitudinal force considerably in excess of that required to apply it to the spindle.

An oil saturated packing disc 80 may be inserted in a pocket 81 provided in the rubber tread portion adjacent the outer end of the bearing support 74 and retained in position by means of a reflecting lens 82 mounted in a cavity in the end of the rubber tread portion.

While the same general principles of construction are involved in the two structures described, the modification has distinct advantages from the standpoint of cost of material, simplicity and economy of production. The principal economies result from the substitution of a cast metal support for the stamped and formed supporting frame, and the elimination of the bearing bushing for rotatably supporting the pedal frame on the bearing spindle.

Features of construction common to the two devices are the unitary frame comprising the central bearing portion with the lateral tread supports completely enclosed in the rubber tread surface, and the spring and groove connection between the tread unit and the spindle bearing to secure the tread and spindle in assembly.

The flat faced treads with the oval profiles in both designs provide a comfortable rest for the foot and give a graceful streamlined appearance to the pedal.

The light reflector in the end of the pedal tread enhances the appearance and increases the safety factor for night riding.

Due to the simplicity of the structure comprising the fewest possible metal parts which may be assembled without screws, bolts, nuts or ball bearings, it lends itself to easy assembly, resulting in a unitary structure which will be of a permanent character since there are no parts to loosen or rust.

The heavy tread molded upon the frame will not twist or become distorted and may be supplied in any desired colors.

The bearing has a long life and will be effectively sealed when inserted in the pedal pad, and the pedal pads are interchangeable on the spindles.

No brazing, welding, plating or other expensive operations are required.

Although I have shown and described my invention with respect to certain details of construction, it is to be understood that I do not wish to be unduly limited thereto, certain modifications being possible without departing from the spirit or scope of my invention.

I claim:

In a pedal for bicycles in combination, a unitary tread support of metal comprising a tubular bearing member, a pair of angular straps attached to one end of the tubular member and extending forwardly of the tubular member upon opposite sides thereof, a second pair of angular straps attached to the opposite ends of the tubular member and lying in overlapping relation with the first angular straps to complete a frame surrounding the tubular member but spaced therefrom, and a plastic tread surface enclosing the metal tread support.

JAMES H. COUNTRYMAN.

REFERENCES CITED

The following references are of record in the file of this patent:

UNITED STATES PATENTS

| Number | Name | Date |
| --- | --- | --- |
| 1,070,971 | Lowd | Aug. 19, 1913 |
| 1,974,247 | Musselman | Sept. 18, 1934 |
| 2,084,373 | Anderson | June 22, 1937 |
| 2,121,868 | Gelder | June 28, 1938 |
| 2,178,921 | Schwinn | Nov. 7, 1939 |
| 2,298,283 | Duffy | Oct. 13, 1942 |
| 2,334,442 | Salimbene | Nov. 16, 1943 |

FOREIGN PATENTS

| Number | Country | Date |
| --- | --- | --- |
| 24,007 of 1892 | Great Britain | Dec. 29, 1892 |
| 373,012 | Great Britain | May 19, 1932 |
| 573,351 | Great Britain | Nov. 16, 1945 |